(12) United States Patent
Hulshof et al.

(10) Patent No.: US 9,967,935 B2
(45) Date of Patent: May 8, 2018

(54) LED LIGHT SOURCE WITH IMPROVED GLOW REDUCTION

(71) Applicant: PHILIPS LIGHTING HOLDING B.V., Eindhoven (NL)

(72) Inventors: Fokko Jan Willem Hulshof, Eindhoven (NL); Wilhelmus Josephus Cornelissen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/161,370

(22) Filed: May 23, 2016

(65) Prior Publication Data
US 2016/0360588 A1 Dec. 8, 2016

(30) Foreign Application Priority Data

Jun. 4, 2015 (EP) .................................... 15170629

(51) Int. Cl.
*H05B 33/08* (2006.01)

(52) U.S. Cl.
CPC ....... *H05B 33/0845* (2013.01); *H05B 33/083* (2013.01); *H05B 33/0809* (2013.01); *H05B 33/0821* (2013.01); *H05B 33/0827* (2013.01)

(58) Field of Classification Search
CPC ............ H05B 33/0815; H05B 33/0818; H05B 33/0884; H05B 33/0809; H05B 33/0848; H05B 33/0896; H05B 33/0803

(Continued)

(56) References Cited

U.S. PATENT DOCUMENTS

| 8,829,819 B1* | 9/2014 | Angeles ............. H05B 33/0815 315/219 |
| 2007/0024213 A1* | 2/2007 | Shteynberg ........ H05B 33/0815 315/291 |

(Continued)

FOREIGN PATENT DOCUMENTS

WO WO2013132379 A1 9/2013

*Primary Examiner* — Douglas W Owens
*Assistant Examiner* — Syed M Kaiser
(74) *Attorney, Agent, or Firm* — Akarsh P. Belagodu

(57) ABSTRACT

The invention relates to a LED light source comprising: input terminals for connection to a mains voltage supply source, a rectifier coupled to the input terminals for rectifying the mains supply voltage supplied by the mains supply voltage source and comprising rectifier output terminals, a DC-DC converter for generating a DC current out of the rectified mains supply voltage, comprising converter input terminals connected to the rectifier output terminals and comprising a first converter output terminal and a second converter output terminal, a LED load with an anode coupled to the first converter output terminal via a first current control element for blocking a current flowing from the anode of the LED load to the first converter output terminal, and with a cathode coupled to the second converter output terminal via a first controllable switch having a control electrode coupled to first control circuitry for rendering the controllable switch non-conductive in case the LED light source is in standby mode, whereby the cathode of the LED load is coupled to the first controllable switch via a second current control element for blocking a current flowing from the first controllable switch.

12 Claims, 4 Drawing Sheets

(58) Field of Classification Search
USPC .............. 315/291, 294, 201, 224, 226, 307
See application file for complete search history.

(56) References Cited

U.S. PATENT DOCUMENTS

| | | | | |
|---|---|---|---|---|
| 2008/0111528 | A1* | 5/2008 | Wang | H05B 33/0815 323/282 |
| 2008/0298094 | A1* | 12/2008 | Cuadra | H02M 3/33561 363/21.12 |
| 2011/0309759 | A1* | 12/2011 | Shteynberg | H05B 33/0815 315/201 |
| 2012/0169240 | A1* | 7/2012 | Macfarlane | H02M 1/4225 315/152 |
| 2012/0256550 | A1* | 10/2012 | Akiyama | H05B 33/0824 315/187 |
| 2012/0268026 | A1* | 10/2012 | Crawford | H05B 33/0815 315/210 |
| 2013/0163270 | A1* | 6/2013 | Burgin | B66B 11/0233 362/544 |
| 2013/0221864 | A1* | 8/2013 | Fukasawa | H05B 33/0809 315/200 R |
| 2013/0293129 | A1* | 11/2013 | Seider | H05B 33/0812 315/193 |
| 2014/0167728 | A1* | 6/2014 | Liu | G05F 1/455 323/318 |
| 2014/0312795 | A1* | 10/2014 | Radermacher | H05B 33/0809 315/200 R |
| 2015/0327349 | A1* | 11/2015 | Lee | F21K 9/232 362/294 |
| 2016/0088702 | A1* | 3/2016 | Gray | H05B 33/0851 315/185 R |

* cited by examiner

LED LIGHT SOURCE WITH IMPROVED GLOW REDUCTION

FIELD OF THE INVENTION

The invention relates to the field of LED light sources. More in particular, the invention relates to LED light sources equipped with a standby function, in other words the operation of the LED light source can be stopped while the mains supply is still connected to it.

BACKGROUND OF THE INVENTION

Lighting systems based on LEDs are used on an increasing scale. LEDs have a high efficiency and a long life time. In many lighting systems, LEDs also offer a higher optical efficiency than other light sources. As a consequence, LEDs offer an interesting alternative for the well known light sources such as fluorescent lamps, high intensity discharge lamps or incandescent lamps.

LED light sources are often comprised in a lighting system, wherein the operation of the LED light sources is controlled by control commands. Such control commands include commands for activating the LED light source and commands for stopping the operation of the LED light source, i.e. commands to start generating a LED current and commands to stop generating a LED current, respectively. In the latter case, operation is not stopped by interrupting the connection of the LED light source to the mains supply but by stopping for instance the operation of a converter circuit comprised in the LED light source. In this latter case, the LED light source is said to be in standby mode. In this standby mode, since the mains supply is still connected to the LED light source, the LED light source is still capable to receive further commands and process those commands. At the same time, however, the mains supply may cause a leakage current through parasitic capacitances and (part of) the LED load comprised in the LED light source. This leakage current can cause the LED string to generate a small amount of light resulting in a glow effect that is often undesirable.

Published international patent application WO 2013/132379, commonly assigned herewith to the same applicant, relates to a LED light source allowing that during operation, a current supplying the LEDs can flow through a current control element and also through a first controllable switch that is maintained in the conductive state. In case the LED current supplied to the LED load by the converter is stopped, the LED light source is in a standby state and the first controllable switch is rendered non-conductive. As a result, leakage currents flowing from the mains supply to the LED load via parasitic capacitances are effectively suppressed, so that the LEDs do not generate a small amount of light during the standby state. However, surprisingly, the LED light source described in WO 2013/132379 cited above, may still suffer from undesirable glow effect during operation under certain conditions.

Notably, though such LED light source functions properly in combination with LED boards having a relatively low capacitance and with LED boards having a relatively high capacitance to protective earth, some glow effect may occur when such LED light source is combined with LED boards having a moderate parasitic capacitance.

In the current disclosure, what will be referred to as a LED load may comprise one LED or a plurality of LEDs. When the LED load comprises a plurality of LEDs in a series arrangement, then what will be referred to as an anode of the LED load will be the anode of the first LED in the series arrangement that is to be flowed through with current, and what will be referred to as a cathode of the LED load will be the cathode of the last LED in the series arrangement that is to be flowed through with current. Similarly, when the LED load comprises a plurality of LEDs in a parallel arrangement, with possibly a plurality of parallel branches each comprising a plurality of LED arranged in series, then what will be referred to as an anode of such an arrangement will be the electrical node that is of the same potential as the anodes of the first LEDs of each parallel branch to be flowed through with current, while what will be referred to as a cathode of such an arrangement will be the electrical node that is of the same potential as the cathodes of the last LED in each parallel branch to be flowed through with current. In other words, the anode of the LED load will be considered as the most positive node thereof, while the cathode will be considered as the most negative node.

SUMMARY OF THE INVENTION

It is an object of the invention to provide a LED light source having an improved glow reduction, notably in comparison with the LED light source described in WO 2013/132379 cited above.

According to a first aspect of the invention, a LED light source is provided, comprising:
  input terminals for connection to a mains voltage supply source,
  a rectifier coupled to the input terminals for rectifying the mains supply voltage supplied by the mains supply voltage source and comprising rectifier output terminals,
  a DC-DC converter for generating a DC current out of the rectified mains supply voltage, comprising converter input terminals connected to the rectifier output terminals and comprising a first converter output terminal and a second converter output terminal,
  a LED load comprising one or more LEDs and having an anode as its most positive node and a cathode as its most negative node, the anode of the LED load being coupled to the first converter output terminal via a first current control element for blocking a current flowing from the anode of the LED load to the first converter output terminal, and the cathode of the LED load being coupled to the second converter output terminal via a first controllable switch having a control electrode coupled to first control circuitry for rendering the controllable switch non-conductive in case the LED light source is in standby mode, whereby the cathode of the LED load is coupled to the first controllable switch via a second current control element for blocking a current flowing from the first controllable switch to the cathode of the LED load.

Thus, the first current control element and the second control element do not allow any undesirable current to flow through the load, which would be likely to result in glow effect, whatever the used configuration of the LED board.

In accordance with a further aspect of the invention, the second current control element can comprise a diode.

In accordance with a further aspect of the invention, the first current control element can comprise a diode.

In a further embodiment of the invention, the LED light source can be provided with a protective earth terminal PE, and a predominantly capacitive element coupled between the protective earth terminal PE and a node coupling the first controllable switch and the second current control element.

In a further embodiment of the invention, at least the DC-DC converter can be located on a first PCB, the first current control element and/or the second current control element being located on said first PCB.

In a further embodiment of the invention, at least the LED load can be located on a second PCB, the first control element and/or the second current control element being located on said second PCB.

In a further embodiment of the invention, the first and second current control elements can each have a parasitic capacitance that is smaller than the parasitic capacitance across the first controllable switch.

BRIEF DESCRIPTION OF THE DRAWINGS

These and other characteristics and advantages of the invention will be made clearer in view of the detailed description given below of preferred embodiments, provided by way of an illustrative and non-limiting example only, as well as the accompanying drawings which represent.

DETAILED DESCRIPTION OF EMBODIMENTS

Figure 1:
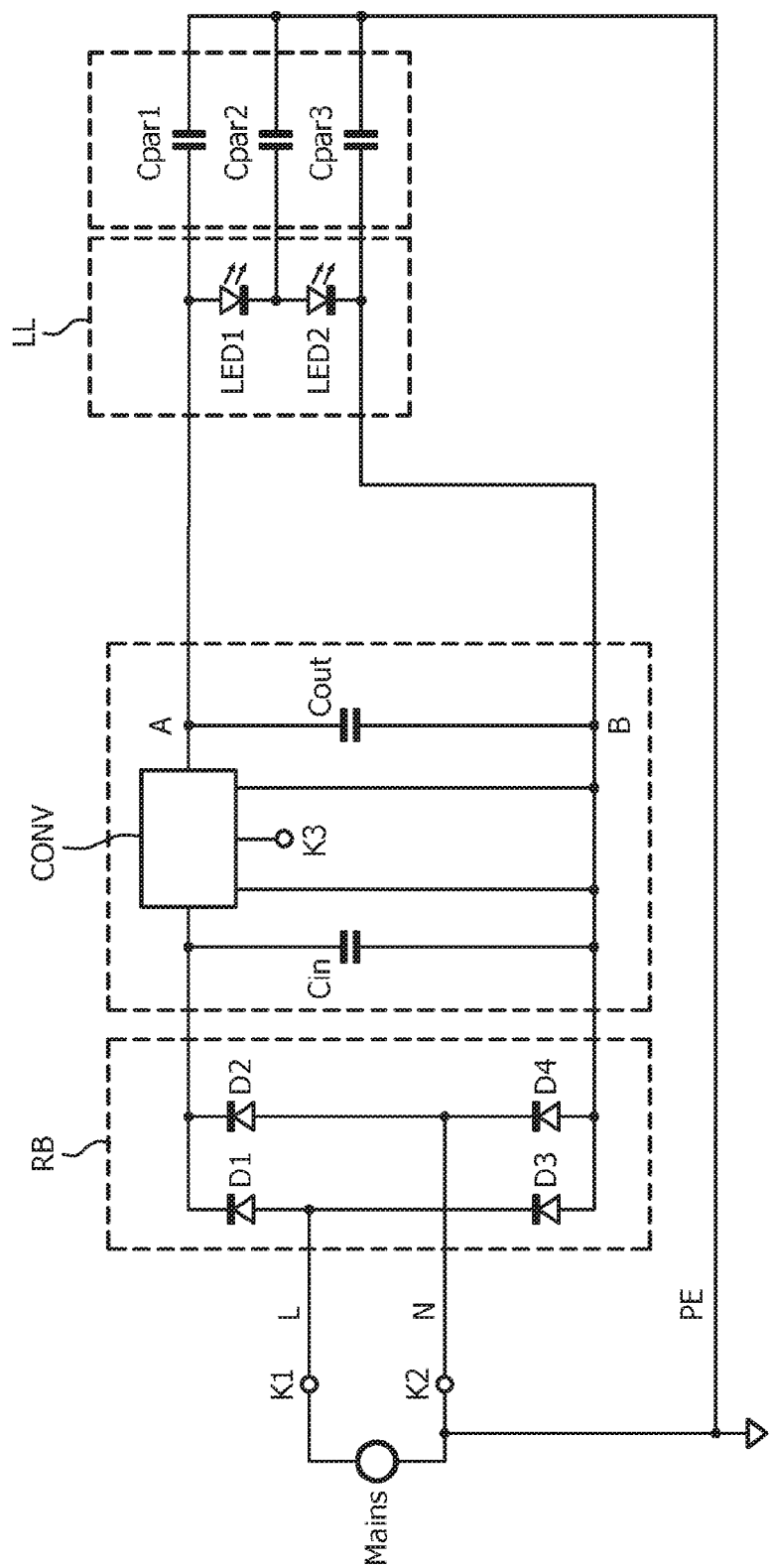
FIG. 1, a LED light source known in the prior art, that does not comprise a glow reduction circuit.

In FIGS. 1, K1 and K2 are input terminals for connection to a mains supply source. Diodes D1-D4 form a rectifier RB comprising rectifier output terminals. The rectifier output terminals are connected to respective converter input terminals of a DC-DC converter CONV for generating a DC-current out of the rectified mains supply voltage. The converter CONV comprises a first converter output terminal A and a second converter output terminal B. The converter input terminals are connected by means of a capacitor Cin and the first and second converter output terminals are connected by means of a capacitor Cout.

Converter CONV is equipped with an input terminal K3 for receiving a control signal that activates or stops the operation of a converter control circuit comprised in the DC-DC converter and thereby, respectively, starts the operation of the LED light source or causes the LED light source to go into standby mode. The control signal can for instance be generated by light control circuitry in a lighting system of which the LED light source forms part.

The DC-DC converter CONV may comprise one or more converter stages. In case the DC-DC converter comprises multiple stages, the first stage may be a power factor correction (PFC) stage, matching the LED light source to the supplying mains, and one or more output stages, matching the converter to the LED load.

The first converter output terminal A is connected to an anode of a LED load LL. In FIG. 1, the LED load LL is schematically represented by two LEDs, LED1 and LED2. In practice, the LED load will generally comprise a far higher number of LEDs. A cathode of the LED load LL is connected to the second converter output terminal B.

The LED light source shown in FIG. 1 is very suitable to be used in a luminaire. For safety reasons such a luminaire is usually connected to a protective earth PE, which in turn is coupled to the "neutral" of the mains supply source. Coupling of the PE to the "neutral" of the mains supply source is not necessarily done through a direct connection as depicted in FIG. 1. Such coupling can be done at utility-grid level, or via a line filter capacitor such as a so-called "Y cap". The LED load may couple with the luminaire and thus also with the protective earth PE by means of the parasitic capacitances schematically represented in FIG. 1 as Cpar1, Cpar2 and Cpar3.

During normal operation of the LED light source shown in FIG. 1, the mains supply voltage is rectified by rectifier RB, and DC-DC converter CONV generates, out of the rectified mains supply voltage, a DC current that is supplied to the LED load LL. This DC current causes the LEDs to generate light.

However, in case a control signal that stops the operation of the DC-DC converter is received at terminal K3, the DC current that flows through the LEDs is no longer generated and the LED light source is in standby mode.

Since the input terminals of the LED light source are still connected to the mains supply source, the parasitic capacitances coupling the protective earth to the LED load cause an AC leakage current to flow.

During a first part of the mains cycle, a first current flows from terminal K2 through parasitic capacitance Cpar3 and diode D3 to input terminal K1. A second current flows from input terminal K2, through Cpar2, LED2 and diode D3 to input terminal K1. A third current flows from terminal K2, through parasitic capacitance Cpar1, capacitor Cout and diode D3 to input terminal K1. These currents charge the parasitic capacitances.

During a second part of the mains cycle, a current flows from terminal K1, through diode D1 and capacitor Cin to converter output terminal B. From converter output terminal B a first current flows through capacitor Cout and parasitic capacitance Cpar1 to input terminal K2. A second current flows from converter output terminal B through capacitor Cout, LED1 and parasitic capacitance Cpar2 to input terminal K2. A third current flows from converter output terminal B through parasitic capacitance Cpar3 to terminal K2. These currents discharge the parasitic capacitances.

The leakage current thus flows through the parasitic capacitances and also partly through the LEDs and thereby causes the LEDs to generate a small amount of light that is considered undesirable.

Figure 2:
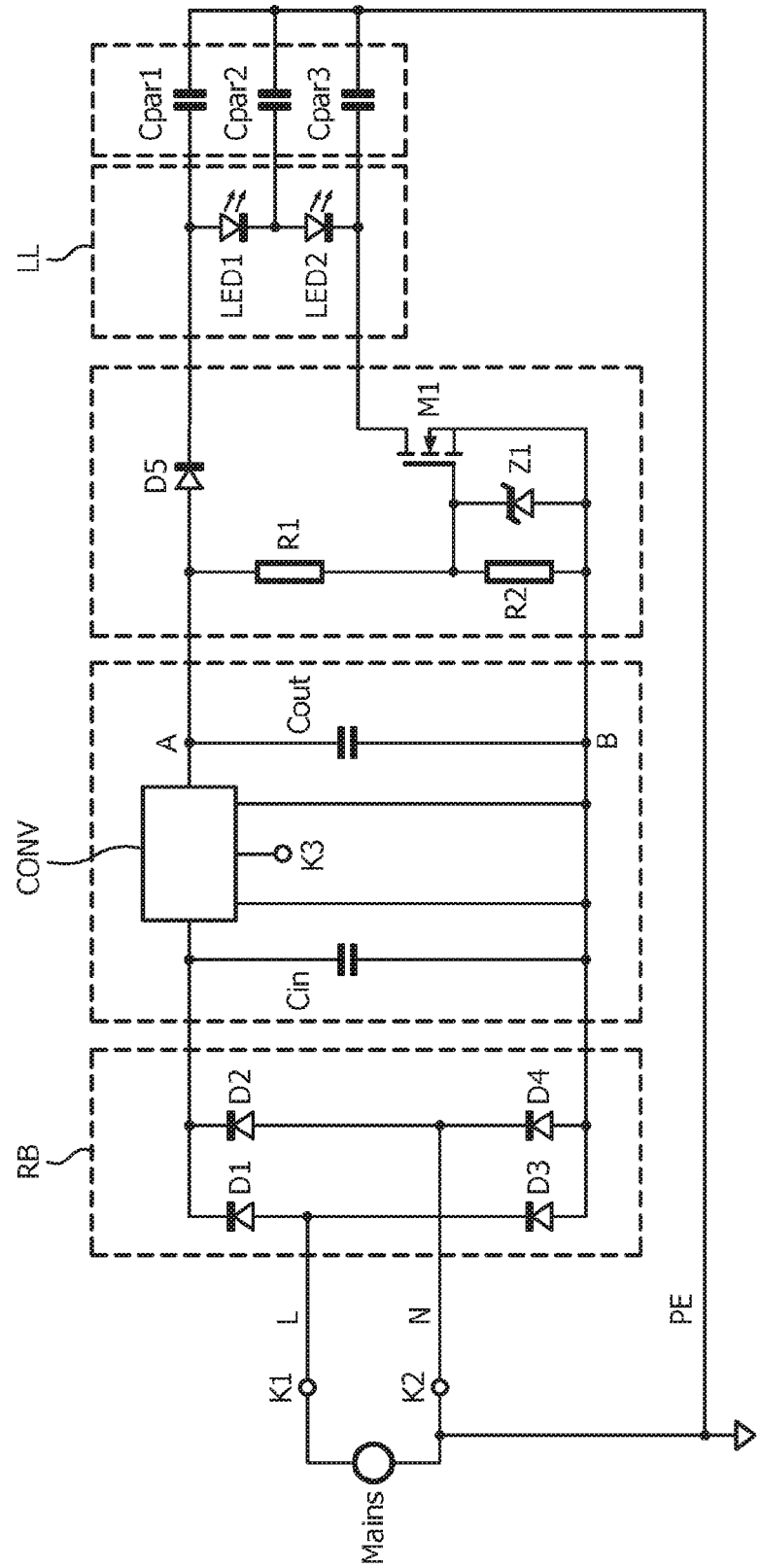
FIG. 2, a LED light source comprising a glow reduction circuit, known in the prior art.

The LED light source shown in FIG. 2 is described in previously cited patent application WO 2013/132379. It differs from the LED light source shown in FIG. 1 in that the LED light source of FIG. 2 further comprises resistors R1 and R2, diode D5, first controllable switch M1 and Zener diode Z1. In the embodiment shown in FIG. 2, the first controllable switch is a FET. The converter output terminals of DC-DC converter CONV are connected by means of a series arrangement of resistor R1 and resistor R2. A common terminal of resistor R1 and resistor R2 is connected to a control electrode of first controllable switch M1 and resistor R2 is shunted by Zener diode Z1. Resistor R1, resistor R2 and Zener diode Z1 together form first control circuitry for rendering the controllable switch M1 non-conductive in case the operation of the DC-DC converter is stopped and the LED light source is in standby mode.

During normal operation of the LED light source shown in FIG. 2, the voltage across capacitor Cout and thus across the series arrangement of resistor R1 and resistor R2 is high enough to maintain the first controllable switch M1 in a conductive state. As a consequence, the normal operation of the LED light source shown in FIG. 2 is very similar to the normal operation of the prior art LED light source shown in FIG. 1, since the diode D5 and the controllable switch M1 conduct the DC current generated by the DC-DC converter CONV.

In case the DC-DC converter receives a control signal at its terminal K3 to change from normal operation to standby mode, the operation of the DC-DC converter is stopped, the DC current supplying the LED load is no longer generated and the voltage between the converter output terminals decreases so that the first controllable switch M1 becomes non-conductive. Diode D5 and the body diode of controllable switch M1 block the leakage current, so that the parasitic capacitances are no longer charged and discharged, and the LEDs no longer generate a small amount of light, when the LED light source is in standby mode, so that the glow effect is effectively suppressed.

It is noted that in case the diode D5 were dispensed with, the LEDs would still generate a small amount of light. This is because the LEDs would carry a reverse current flowing from their cathode to their anode for a high momentary magnitude of the mains voltage, when the voltage at terminal K2 is higher than the voltage at terminal K1. This current charges the parasitic capacitances. The LEDs would subsequently carry a current discharging the parasitic capacitances and flowing from their anode to their cathode in case the voltage at terminal K1 is higher than the voltage at terminal K2. In the embodiment shown in FIG. 2, the reverse current flowing through the LEDs is blocked by diode D5, acting as a first current control element.

However a LED light source as illustrated in FIG. 2 may still exhibit some glow effect under some circumstances, as explained in more detail hereinafter in reference to FIGS. 3 and 4.

Figure 3:
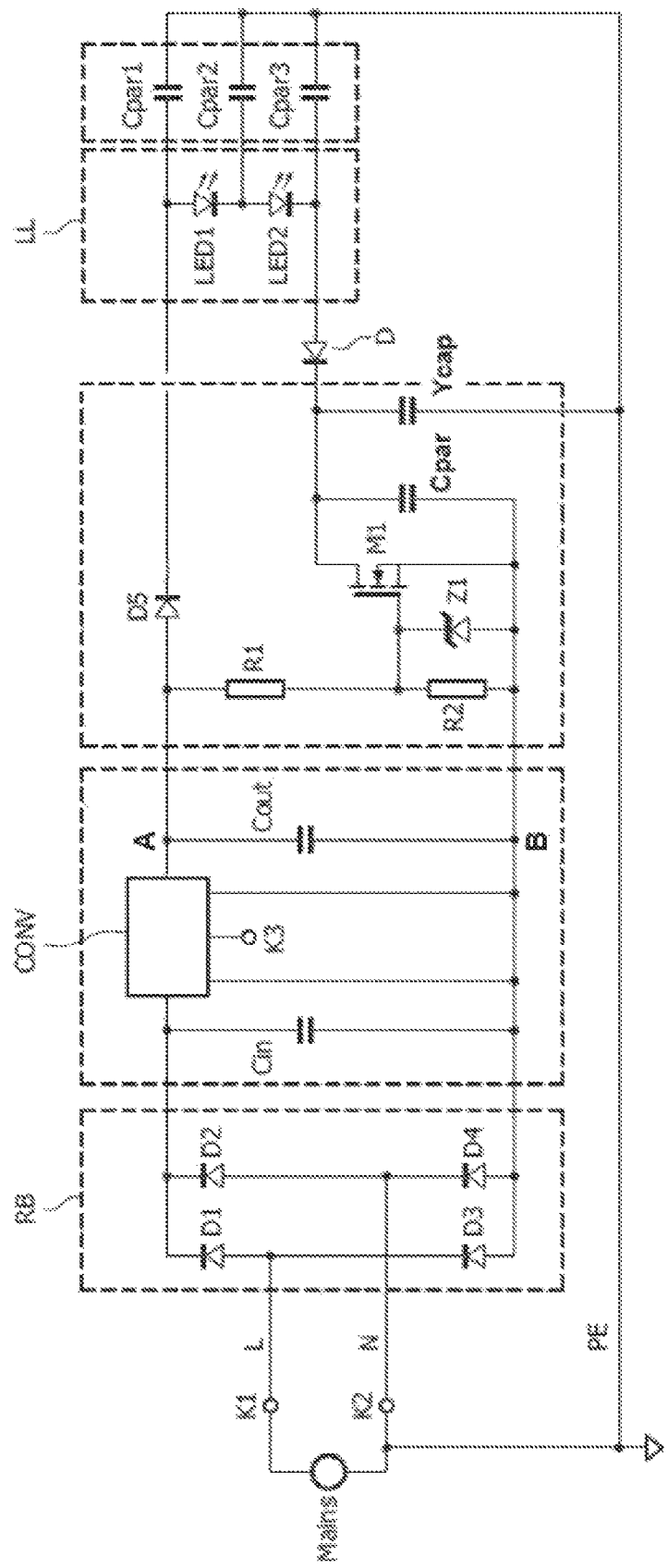
FIG. 3, a LED light source with an improved glow reduction circuit, in an exemplary embodiment of the invention.
Figure 4:
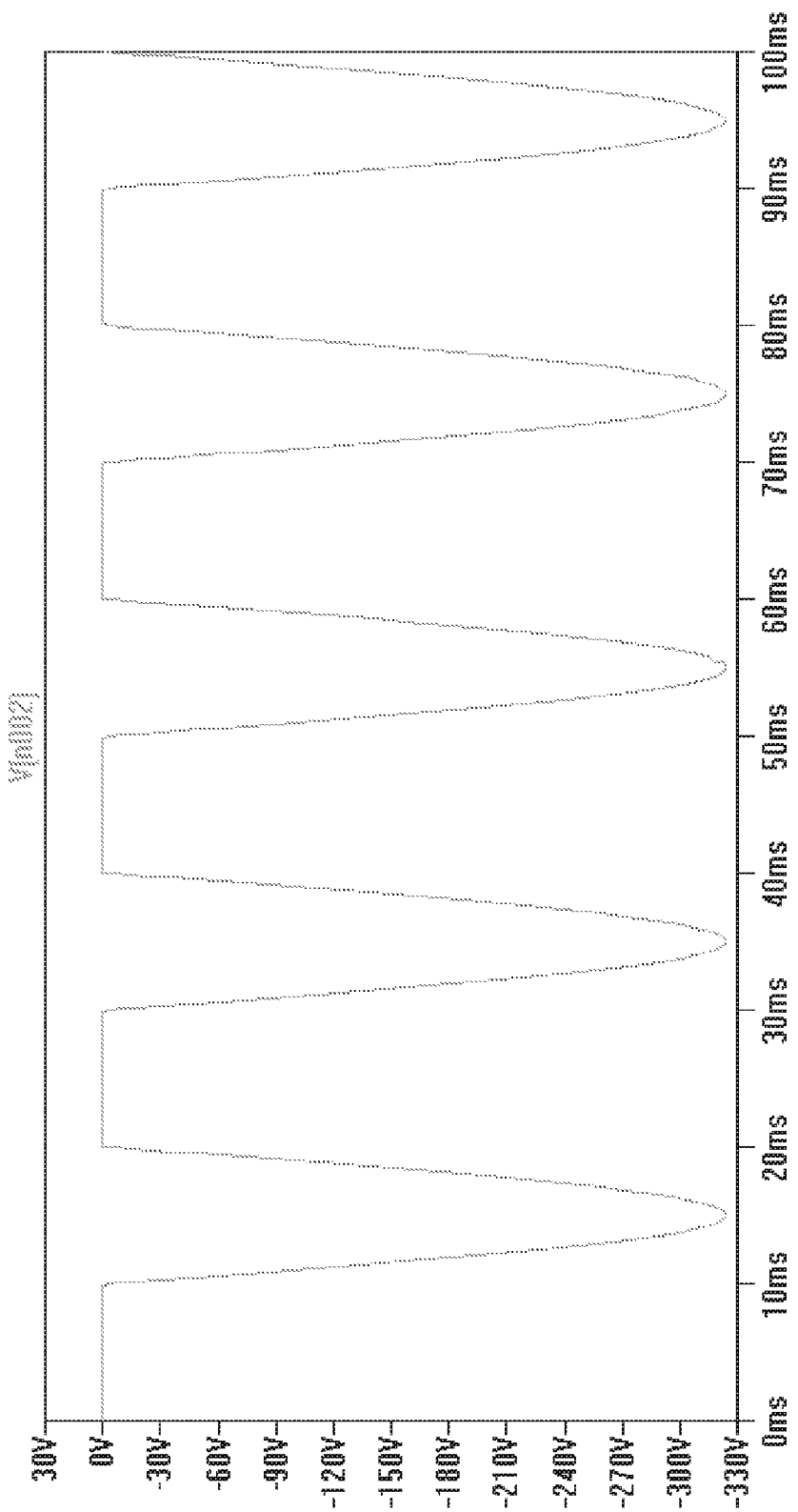
FIG. 4, a diagram depicting a voltage waveform resulting from a parasitic capacitance in a LED light source comprising a glow reduction circuit as illustrated by FIG. 2.

FIG. 3 illustrates a LED light source with an improved glow reduction circuit, in an exemplary embodiment of the invention. FIG. 3 is substantially similar to FIG. 2, and most of the elements depicted in FIG. 3 are introduced above in reference to FIG. 2. In contrast to FIG. 2, FIG. 3 further discloses a typical line filter capacitor such as a so-called "Y capacitor" Ycap, which is a predominantly capacitive element that couples the drain electrode of the controllable switch M1 to PE. Furthermore, the controllable switch M1 itself has a parasitic capacitance, designated as Cpar in FIG. 3, between the drain electrode and the source electrode of controllable switch M1. The parasitic capacitance Cpar of the controllable switch M1 has been identified by the inventors as being the root cause for the flow of an undesirable current resulting in glow effect even during the non-conductive state of controllable switch M1. FIG. 4 shows the waveform of the voltage difference between the second output terminal B of converter CONV and PE. Cpar and Ycap form a capacitive divider for the voltage difference between the second output terminal B and PE. However, the remaining magnitude of the voltage difference between the drain of controllable switch M1 and PE can still be high enough to result in a current flowing through the LED load LL, likely to make the LED load emit glow light. As depicted in FIG. 3, the predominantly capacitive element may be coupled between the protective earth PE and a node coupling the first controllable switch M1 and the second current control element D, which has a beneficial technical effect of further improving glow current reduction.

The current invention proposes that a second current control element is employed for blocking a current flowing from the first controllable switch M1 to the cathode of the LED load LL. In the exemplary embodiment illustrated by FIG. 3, the second current control element is preferably formed by a diode D, but may e.g. also be formed by a thyristor, sidac or Zener. The anode of diode D is electrically coupled to the cathode of the LED load LL, while the cathode of diode D is electrically coupled to the drain of the controllable switch M1.

The technical function of the second current control element is that its parasitic capacitance that can be designated as CparD together with parasitic capacitance of the LED board Cpar3 forms a further capacitive divider of the voltage difference between the drain of controllable switch M1 and PE, such that only low ripple voltage remains on the LED board. If that ripple voltage is lower than the forward voltage of the LED load LL, then no visible glow light will be present. Preferably, the first and the second current control elements are chosen to each have a parasitic capacitance smaller than the parasitic capacitance Cpar across controllable switch M1, that is: the capacitance between the source and the drain of the controllable switch M1.

In some embodiments, all the components of the LED light source may be implemented on a same Printed Circuit Board (PCB) substrate.

In other exemplary embodiments, the DC-DC converter CONV, and possibly the rectifier RB, as well as the capacitors Cin and Cout, may be physically located on a first PCB, or so-called "driver PCB", while the LED load LL may be physically located on a second PCB, or "LED board" as referred to above. The first current control element D5 and/or the second current control element D may be physically implemented on either the first or the second PCB.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A light emitting diode (LED) light source comprising:
    input terminals for connection to a mains voltage supply source;
    a rectifier coupled to the input terminals for rectifying the mains supply voltage supplied by the mains supply voltage source and comprising rectifier output terminals, a DC-DC converter for generating a DC current out of the rectified mains supply voltage, comprising converter input terminals connected to the rectifier output terminals and comprising a first converter output terminal and a second converter output terminal, a LED load comprising one or more LEDs and having an anode as its most positive node and a cathode as its most negative node;
    a protective earth terminal;
    the anode being coupled to the first converter output terminal via a first current control element for blocking a current flowing from the anode of the LED load to the first converter output terminal, and the cathode being coupled to the second converter output terminal via a first controllable switch having a control electrode coupled to first control circuitry for rendering the controllable switch non-conductive in case the LED light source is in standby mode, wherein the first controllable switch stores a charge, whereby the cathode of the LED load is coupled to the first controllable switch via a second current control element which blocks a current flowing from the stored charge of the first controllable switch from flowing to the cathode of the LED load, and a capacitive element coupled between the protective earth terminal and a node coupling the first controllable switch and the second current control element.

2. The LED light source of claim 1, wherein the second current control element comprises a diode.

3. The LED light source of claim 1, wherein the first current control element comprises a diode.

4. The LED light source of claim 1, wherein at least the DC-DC converter is located on a first printed circuit board (PCB), the first current control element and/or the second current control element being located on said first PCB.

5. The LED light source of claim 1, wherein at least the LED load is located on a second PCB, the first control element and/or the second current control element being located on said second PCB.

6. The LED light source of claim 1, wherein the first and second current control elements are each selected to have a parasitic capacitance that is smaller than the parasitic capacitance across the first controllable switch.

7. A light emitting diode (LED) light source comprising:
input terminals for connection to a mains voltage supply source;
a rectifier coupled to the input terminals for rectifying the mains supply voltage supplied by the mains supply voltage source and comprising rectifier output terminals, a DC-DC converter for generating a DC current out of the rectified mains supply voltage, comprising converter input terminals connected to the rectifier output terminals and comprising a first converter output terminal and a second converter output terminal, a LED load comprising one or more LEDs and having an anode as its most positive node and a cathode as its most negative node;
the anode being coupled to the first converter output terminal via a first current control element for blocking a current flowing from the anode of the LED load to the first converter output terminal, and the cathode being coupled to the second converter output terminal via a first controllable switch having a control electrode coupled to first control circuitry for rendering the controllable switch non-conductive in case the LED light source is in standby mode, wherein the first controllable switch stores a charge, whereby the cathode of the LED load is coupled to the first controllable switch via a second current control element which blocks a current flowing from the stored charge of the first controllable switch from flowing to the cathode of the LED load;
wherein the first and second current control elements are each selected to have a parasitic capacitance that is smaller than the parasitic capacitance across the first controllable switch.

8. The LED light source of claim 7, wherein the second current control element comprises a diode.

9. The LED light source of claim 7, wherein the first current control element comprises a diode.

10. The LED light source of claim 7, wherein the LED light source is provided with a protective earth terminal, and a capacitive element is coupled between the protective earth terminal and a node coupling the first controllable switch and the second current control element.

11. The LED light source of claim 1, wherein at least the DC-DC converter is located on a first printed circuit board (PCB), the first current control element and/or the second current control element being located on said first PCB.

12. The LED light source of claim 1, wherein at least the LED load is located on a second PCB, the first control element and/or the second current control element being located on said second PCB.

* * * * *